United States Patent
Hoshina et al.

(10) Patent No.: US 9,923,203 B2
(45) Date of Patent: Mar. 20, 2018

(54) POSITIVE ELECTRODE ACTIVE MATERIAL, NONAQUEOUS ELECTROLYTE BATTERY, AND BATTERY PACK

(71) Applicant: KABUSHIKI KAISHA TOSHIBA, Tokyo (JP)

(72) Inventors: Keigo Hoshina, Kanagawa (JP); Hiroki Inagaki, Kanagawa (JP); Norio Takami, Kanagawa (JP); Kiyoshi Kanamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 543 days.

(21) Appl. No.: 14/505,983

(22) Filed: Oct. 3, 2014

(65) Prior Publication Data
US 2015/0099159 A1 Apr. 9, 2015

(30) Foreign Application Priority Data

Oct. 4, 2013 (JP) ................. 2013-209527

(51) Int. Cl.
*H01M 4/58* (2010.01)
*C01B 25/45* (2006.01)
*H01M 10/0525* (2010.01)
*H01M 4/485* (2010.01)

(52) U.S. Cl.
CPC ........... *H01M 4/5825* (2013.01); *C01B 25/45* (2013.01); *H01M 4/485* (2013.01); *H01M 10/0525* (2013.01); *Y10T 428/2982* (2015.01)

(58) Field of Classification Search
CPC ............... H01M 4/5825; H01M 4/485; H01M 10/0525; Y10T 428/2982
See application file for complete search history.

(56) References Cited

U.S. PATENT DOCUMENTS

| | | | |
|---|---|---|---|
| 2012/0301780 A1* | 11/2012 | Kitagawa | H01M 4/505 429/231.1 |
| 2016/0013474 A1* | 1/2016 | Liu | H01M 4/5825 429/224 |
| 2016/0190586 A1* | 6/2016 | Hoshina | H01M 4/5825 429/221 |

FOREIGN PATENT DOCUMENTS

| | | |
|---|---|---|
| JP | 2008-34306 | 2/2008 |
| JP | 2008-184346 | 8/2008 |

\* cited by examiner

*Primary Examiner* — Laura Weiner
(74) *Attorney, Agent, or Firm* — Finnegan, Henderson, Farabow, Garrett & Dunner, L.L.P.

(57) ABSTRACT

A positive electrode active material includes $LiMn_{1-x}M_xPO_4$ (wherein M represents at least one element selected from Mg, Fe, Ni, Co, Ti, and Zr; and $0 \leq x < 0.5$) and has an average pore diameter of 8 nm or more and not more than 25 nm and a total pore volume of 0.05 cm$^3$/g or more and not more than 0.3 cm$^3$/g.

14 Claims, 5 Drawing Sheets

POSITIVE ELECTRODE ACTIVE MATERIAL, NONAQUEOUS ELECTROLYTE BATTERY, AND BATTERY PACK

CROSS-REFERENCE TO RELATED APPLICATION

This application is based upon and claims the benefit of priority from Japanese Patent Application No. 2013-209527, filed on Oct. 4, 2013; the entire contents of which are incorporated herein by reference.

FIELD

Embodiments described herein relate generally to a positive electrode active material, a nonaqueous electrolyte battery, and a battery pack.

BACKGROUND

Nonaqueous electrolyte batteries in which charge/discharge is performed when lithium ions are transferred between a negative electrode and a positive electrode are studied as a high energy density battery.

These nonaqueous electrolyte batteries are expected to be used as not only electrical power sources of mobile devices but also or large-scale electrical power sources such as automobile and stationary power applications. In such large-scale applications, life properties and high safety are required.

For positive electrode active materials of nonaqueous electrolyte batteries, lithium-transition metal complex oxides are generally used, and Co, Mn, Ni, and the like are used as a transition metal. In recent years, spinel type lithium manganate and olivine type compounds such as olivine type lithium iron phosphate and olivine type lithium manganese phosphate are studied as inexpensive and highly safe positive electrode materials.

Since the olivine type compounds are low in electron conductivity or lithium ion conductivity, it has been difficult to obtain good charge/discharge properties. As technologies for enhancing the charge/discharge properties of olivine type compounds, there are studied carbon coating for enhancing the electron conductivity; reduction of a lithium diffusion distance and micronization for increasing a reaction area; and the like.

Embodiments described herein provide an active material for batteries having excellent charge/discharge performance and rate properties, a nonaqueous electrolyte battery containing this active material and having excellent charge/discharge performance and rate properties, and a battery pack provided with this nonaqueous electrolyte battery.

According to one embodiment, a positive electrode active material includes $LiMn_{1-x}M_xPO_4$ (wherein M represents at least one element selected from Mg, Fe, Ni, Co, Ti, and Zr; and $0 \leq x < 0.5$) and has an average pore diameter of 8 nm or more and not more than 25 nm and a total pore volume of 0.05 $cm^3/g$ or more and not more than 0.3 $cm^3/g$.

According to another embodiment, a nonaqueous electrolyte battery includes a negative electrode containing a negative electrode active material, a positive electrode containing the positive electrode active material according to the embodiment, and a nonaqueous electrolyte.

According to still another embodiment, a battery pack includes the nonaqueous electrolyte battery according to the embodiment.

Examples of related art include JP-A-2008-034306 and JP-A-2008-184346.

DETAILED DESCRIPTION

Embodiments are hereunder described by reference to the accompanying drawings.

(First Embodiment)

According to a first embodiment, a positive electrode active material includes $LiMn_{1-x}M_xPO_4$ (wherein M represents at least one element selected from Mg, Fe, Ni, Co, Ti, and Zr; and $0 \leq x < 0.5$) and has an average pore diameter of 8 nm or more and not more than 25 nm and a total pore volume of 0.05 $cm^3/g$ or more and not more than 0.3 $cm^3/g$.

The $LiMn_{1-x}M_xPO_4$ (wherein M represents at least one element selected from Mg, Fe, Ni, Co, Ti, and Zr; and $0 \leq x < 0.5$) is an olivine type lithium manganese phosphate that has high thermal stability and has a noble reversible potential, and can therefore be expected to have a large energy density. Thus, the olivine type lithium manganese phosphate is a material having a possibility such that both properties of safety and high energy density can be made compatible with each other. However, it was difficult to obtain good charge/discharge properties because of low electron conductivity or lithium ion conductivity. Since conventional olivine type compounds have low electron conductivity or lithium ion conductivity, it is difficult to achieve coating with carbon up to the interior of a secondary particle by a technique of mixing an olivine type compound and a carbon precursor for the purpose of obtaining good charge/discharge properties. Thus a thorough charge/discharge reaction may not sufficiently occur up to the interior of a secondary particle. In addition, a micronization technique is an excess lithium method of making a lithium/transition metal ratio in a starting material 30 to 50 times, and it is not preferable from the viewpoints of a cleaning process, raw material costs, and the like.

According to this embodiment, by regulating the average pore diameter of $LiMn_{1-x}M_xPO_4$ to a specified range, good charge/discharge properties can be obtained. When the average pore diameter is too small, a specific surface area relative to the total pore volume as described later becomes excessive, a side reaction with the electrolyte increases, and there is a possibility that the charge/discharge properties are lowered. Thus, such is not preferable. Conversely, when the average pore diameter is too large, the powder strength of the resulting positive electrode active material is lowered, so that it becomes difficult to retain the shape at the time of electrode production or at the time of charge/discharge, and the charge/discharge properties are lowered. Thus, such is also not preferable. For this reason, the average pore diameter of $LiMn_{1-x}M_xPO_4$ is regulated to 8 nm or more and not more than 25 nm. The average pore diameter of $LiMn_{1-x}M_xPO_4$ is preferably 10 nm or more and not more than 17 nm, and more preferably 12 nm or more and not more than 16 nm.

Furthermore, according to this embodiment, by regulating the total pore volume of $LiMn_{1-x}M_xPO_4$ to a specified value or more, a sufficient charge/discharge reaction site can be ensured, so that good charge/discharge properties can be obtained. When the total pore volume is too small, the reaction with an electrolytic solution is not sufficient, and the charge/discharge properties are lowered, and hence, such is not preferable. Conversely, when the total pore volume is too large, the powder strength becomes weak, and hence, such is not preferable. For that reason, the total pore volume of $LiMn_{1-x}M_xPO_4$ is regulated to 0.05 cm$^3$/g or more and not more than 0.3 cm$^3$/g. The total pore volume of $LiMn_{1-x}M_xPO_4$ is preferably 0.06 cm$^3$/g or more and not more than 0.2 cm$^3$/g, and more preferably 0.08 cm$^3$/g or more and not more than 0.15 cm$^3$/g.

The positive electrode active material according to this embodiment is any one or more members selected from a primary particle and a secondary particle having the primary particles aggregated therein and may contain a carbonaceous material for the purpose of enhancing the electron conductivity on the surface of the primary particle and in the interior of the secondary particle.

A specific surface area of $LiMn_{1-x}M_xPO_4$ according to this embodiment is preferably 5 m$^2$/g or more and not more than 100 m$^2$/g. This is made for the purpose of ensuring a sufficient reaction area of the positive electrode active material to enhance the rate properties. When the specific surface area of the positive electrode active material is too small, the sufficiency of the reaction area cannot be ensured. Conversely, when the specific surface area of the positive electrode active material is too large, it becomes difficult to achieve to form an electrode, and hence, such is not preferable. For that reason, the specific surface area of the positive electrode active material is preferably 5 m$^2$/g or more and not more than 100 m$^2$/g, more preferably 10 m$^2$/g or more and not more than 50 m$^2$/g, and still more preferably 20 m$^2$/g or more and not more than 30 m$^2$/g.

In order to shorten the lithium diffusion distance, a particle diameter of the primary particle of $LiMn_{1-x}M_xPO_4$ according to this embodiment is preferably not more than 500 nm, and more preferably 30 nm or more and not more than 100 nm.

In addition, in order to keep the high electron conductivity, a particle diameter of the secondary particle having the primary particles aggregated therein is preferably not more than 20 μm, and more preferably 3 μm or more and not more than 15 μm.

The positive electrode active material according to this embodiment is preferably $LiMn_{1-a-b}Fe_aMg_bPO_4$ (0<a≤0.25 and 0<b≤0.15). This is because an excellent charge/discharge cycle performance and excellent rate properties are revealed.

An exemplary method of the positive electrode active material according to this embodiment is hereunder described.

An Li-containing compound, an Mn-containing compound, an M-containing compound (M represents at least one element selected from Mg, Fe, Ni, Co, Ti, and Zr), and a P-containing compound are mixed with water such that a concentration of metal ions (Li, Mn, and M) is 1.5 moles/L or more and not more than 50 moles/L, and the mixture is provided in an autoclave. On that occasion, in order that the resulting positive electrode active material may be configured to have a carbonaceous material on the surface of the primary particle and in the interior of the secondary particle, a C-containing compound may be mixed as a carbon (C) source. Furthermore, in order to control the shape or crystallinity, or the like of the resulting active material, a pH adjustment may be performed by using an acidic material or an alkaline material. The acidic material is preferably a sulfuric acid solution, and the alkaline material is preferably an ammonia solution.

It is preferable to perform mixing of the above-described respective compounds as raw materials in an inert atmosphere. For example, the mixing can be performed in a nitrogen atmosphere or an argon atmosphere. On this occasion, when the concentration of metal ions (Li, Mn, and M) is too low, the particle of the resulting positive electrode active material becomes large, and the productivity is lowered. Conversely, when the concentration of metal ions is too high, a fine particle is easily formed. As a result, a viscosity of the mixture becomes high, and the reaction is hard to proceed uniformly. For this reason, the concentration of metal ions is preferably 1.5 moles/L or more and not more than 50 moles/L, more preferably 3.0 moles/L or more and not more than 30 moles/L, and still more preferably 5 moles/L or more and not more than 10 moles/L.

On the occasion of mixing, in order to minimize formation of impurities such as unreacted materials in a subsequent synthesis reaction or the like, it is preferable to uniformly mix the mixture obtained by mixing.

When hydrates are used for the Li-containing compound, the Mn-containing compound, and the M-containing compound as raw materials, hydrated crystal water can also be used as a solvent.

Here, examples of the Li-containing compound which can be used include lithium carbonate ($Li_2CO_3$), lithium hydroxide (LiOH), lithium sulfate ($Li_2SO_4$), lithium nitrate ($LiNO_3$), lithium acetate ($LiCH_3CO_2$), lithium chloride (LiCl), lithium phosphate ($Li_3PO_4$), and hydrates of these Li-containing compounds. Lithium sulfate is preferable because it has excellent reactivity.

Examples of the Mn-containing compound which can be used include manganese sulfate ($MnSO_4$), manganese acetate (Mn ($CH_3CO_2$)$_2$), manganese nitrate (Mn ($NO_3$)$_2$), manganese chloride ($MnCl_2$), and hydrates of these Mn-containing compounds. Manganese sulfate is preferable because it has excellent reactivity.

Examples of the M-containing compound which can be used include a sulfate, an acetate, and a chloride each containing M, and hydrates of these M-containing compounds. A sulfate is preferable because it has excellent reactivity.

Examples of the P-containing compound which can be used include lithium phosphate ($Li_3PO_4$), ammonium dihydrogen phosphate ($NH_4H_2PO_4$), diammonium hydrogen phosphate (($NH_4$)$_2HPO_4$), and phosphoric acid ($H_3PO_4$).

The C-containing compound as the carbon source is preferably an organic material containing a functional group (—COOA) (A represents at least one element selected from H, Li, and Na) as represented below. Preferred examples thereof include salicylic acid, acetyl salicylate, carboxymethyl cellulose, carboxymethyl cellulose sodium, naphthalenetetracarboxylic acid, and lithium naphthalenetetracarboxylate. Sugars such as glucose, maltose, sucrose, and cellulose, and benzene ring-containing organic materials can be used. Carboxymethyl cellulose is preferable because an amount of the carbonaceous material attached to the surface of the primary particle and the interior of the secondary particle does not become excessive, and it is possible to enhance the properties due to the attachment of the carbonaceous material.

Subsequently, the mixture provided in the autoclave is subjected to synthesis by means of a heat treatment at a temperature of 110° C. or higher and not higher than 240° C., thereby obtaining a synthetic powder. Here, when the heat treatment temperature is too low, impurities such as unreacted materials can be easily formed. Conversely, when the heat treatment temperature is too high, the synthetic powder causes particle growth, the ion diffusion distance becomes long, and the ion conductivity is lowered. For this reason, the heat treatment temperature at the time of synthesis is preferably 110° C. or higher and not higher than 240° C., more preferably 120° C. or higher and not higher than 170° C., and still more preferably 140° C. or higher and not higher than 160° C. When a heat treatment time is too short, a defect in the crystal of the synthetic powder increases, and the ion conductivity is lowered, and hence, such is not preferable. Conversely, when the heat treatment time is too long, the particle growth is caused, and the ion conductivity is similarly lowered. For this reason, the heat treatment time is preferably one hour or longer and not longer than 10 hours, and more preferably 2 hours or longer and not longer than 5 hours.

A basic step of the present synthesis is a method which is generally called a hydrothermal method.

In the synthesis of a lithium transition metal compound having an olivine structure by a general hydrothermal method, LiOH, a transition metal sulfate compound, and $H_3PO_4$ are used. In this example, in order to prevent the formation of impurities from occurring, it is necessary to mix an excess of LiOH. As an example, a reaction in the case of using Mn as the transition metal is illustrated.

$$3LiOH+MnSO_4+H_3PO_4 \rightarrow LiMnPO_4+Li_2SO_4+3H_2O$$

In the above-described reaction, $Li_2SO_4$ remains in the pressure container. In this reaction, since $Li_2SO_4$ cannot be used as the starting raw material, it is necessary to ultimately discard it.

In contrast, when as the starting raw materials, sulfate compounds are used for the Li source, the Mn source, and the M source, and an ammonium compound is used for the P source, the following reaction is caused.

$$3/2Li_2SO_4+MnSO_4+(NH_4)_2HPO_4 \rightarrow LiMnPO_4+Li_2SO_4+(NH_4)_2SO_4+1/2H_2SO_4$$

In the above-described reaction, after the synthesis, by adding the respective sulfate compounds as the Li source, the Mn source, and the M source and the ammonium compound as the P source to the solution remaining in the pressure container, the synthesis can be repeatedly performed, and it becomes possible to reuse a product after the reaction, and hence, such is preferable.

Subsequently, the resulting synthetic powder is washed and dried, and then subjected to a heat treatment at a temperature of 400° C. or higher and not higher than 800° C., to enhance the crystallinity, and in the case of mixing the C-containing compound, the carbonization is promoted, thereby producing $LiMn_{1-x}M_xPO_4$. It is preferable to perform this heat treatment in an inert atmosphere. By performing the heat treatment in an inert atmosphere, oxidation of the transition metal such as manganese can be inhibited. For example, the heat treatment can be performed in a nitrogen atmosphere or an argon atmosphere. Here, when the heat treatment temperature is too low, a crystal is hardly formed, and the ion conductivity is lowered, and hence, such is not preferable. Conversely, when the heat treatment temperature is too high, the resulting particle causes excessive particle growth, and the ion conductivity is similarly lowered. For this reason, the heat treatment temperature is preferably 400° C. or higher and not higher than 800° C., more preferably 500° C. or higher and not higher than 700° C., and still more preferably 550° C. or higher and not higher than 650° C. When a heat treatment time is too short, it may not be possible to enhance the crystallinity of the resulting synthetic powder, and the ion conductivity is lowered, and hence, such is not preferable. Conversely, when the heat treatment time is too long, the particle growth is caused, and the ion conductivity is similarly lowered. For this reason, the heat treatment time is preferably 0.5 hours or longer and not longer than 10 hours, and more preferably one hour or longer and not longer than 5 hours.

For the purpose of obtaining the positive electrode active material having an average pore diameter of 8 nm or more and not more than 25 nm and a total pore volume of 0.05 $cm^3/g$ or more and not more than 0.3 $cm^3/g$, by controlling a synthesis condition or each of the heat treatment temperatures or times, it becomes possible to obtain the positive electrode active material.

As an example of this embodiment, an example of the production method of $LiMn_{0.75}Fe_{0.25}PO_4$ is illustrated.

Lithium carbonate as the Li-containing compound, manganese sulfate pentahydrate as the Mn-containing compound, and iron sulfate heptahydrate as the Fe-containing compound are used. Furthermore, carboxymethyl cellulose is used as the C-containing compound. These materials are used as raw materials and dissolved in and mixed with pure water in a nitrogen atmosphere. A molar ratio of the metals in the raw materials is set up to the following ratio.

Li/Mn/Fe=3/0.75/0.25

On the occasion of producing $LiMn_{0.75}Fe_{0.25}PO_4$, since lithium-deficient impurities may be easily formed, it is preferable to use Li in an amount of a stoichiometric ratio or more. So long as a molar ratio Li/(Mn+M) of Li to the transition metals in the starting raw materials is 1 or more, the amount of Li is not limited.

Subsequently, a solution prepared by dissolving and mixing the starting raw materials is provided in an autoclave, and after hermetically sealing the autoclave, the solution is subjected to a heat treatment at 200° C. for 3 hours while stirring, thereby achieving the synthesis. On the occasion of the present synthesis, in order to inhibit the formation of impurities, it is preferable to perform the heat treatment while thoroughly stirring the inside of the autoclave.

After the heat treatment, the synthetic powder is extracted by means of centrifugation. After the extraction, in order to prevent the coagulation of the synthetic powder from occurring, the synthetic powder is dried by means of freeze drying and then collected.

The resulting synthetic powder is subjected to a heat treatment at 700° C. for one hour in an argon atmosphere, whereby the desired product $LiMn_{0.75}Fe_{0.25}PO_4$ that is the positive electrode active material can be obtained.

A composition ratio of Mn and the M element in $LiMn_{1-x}M_xPO_4$ can be measured by means of inductively coupled plasma atomic emission spectroscopy (ICP-AES). Specifically, in the case of measuring from a secondary battery, the secondary battery is disassembled in a draft chamber to obtain a positive electrode. The resulting positive electrode is shaved to, prepare a sample. The sample is thermally decomposed with sulfuric acid, nitric acid, perchloric acid, and hydrogen fluoride and then dissolved in dilute nitric acid, thereby making the volume constant. This solution is subjected to quantitative determination for Mn and M by means of the ICP-AES.

Here, a method of measuring the average pore diameter and total pore volume is described.

Examples of the method of measuring the average pore diameter, total pore volume, and pore distribution include a nitrogen gas adsorption method, a mercury press-in method, and a small-angle X-ray scattering method. However, in order to accurately measure nano-scale pores of $LiMn_{1-x}M_xPO_4$, a nitrogen gas adsorption method is suitable.

Specifically, for example, Shimadzu-Micromeritics, ASAP-2010 Instrument (nitrogen gas adsorption and pore distribution/specific surface area measurement) can be used for a measurement device. A sample of $LiMn_{1-x}M_xPO_4$ is filled in a measuring cell and subjected to a degassing treatment, followed by performing the measurement.

The BJH (Barrett-Joyner-Halenda) method is used as an analysis method for computing the average pore diameter, total pore volume, and pore distribution. The average pore diameter refers to a value obtained by dividing 4 times of the total pore volume by a surface area. On the assumption that all pores in the sample have a cylindrical shape, a cylindrical pore is defined to have a volume V. At that time, the volume of the cylindrical pore is expressed according to the following equation (1).

$$V=\pi D^2 L/4 \qquad (1)$$

Here, D represents a pore diameter; and L represents a length of the cylindrical pore. Next, a lateral area A of the cylindrical pore is expressed according to the following equation (2).

$$A=\pi DL \qquad (2)$$

The following equation (3) is obtained from the foregoing equations (1) and (2).

$$D=4V/A \qquad (3)$$

D calculated according to the foregoing equation (3) is defined as the average pore diameter.

As for the total pore volume, an accumulated value of the pores in the entire range obtained from the pore distribution results by the BJH method is defined as the total pore volume.

Specifically, in the case of measuring from a secondary battery, the secondary battery is disassembled in a draft chamber, and $LiMn_{1-x}M_xPO_4$ contained in the electrode is extracted and measured. For example, in the case where a conductive agent such as carbon and a polymer such as a high-molecular material are contained in the electrode, the layer containing $LiMn_{1-x}M_xPO_4$ is taken off from a current collector, and the high-molecular material is removed by the Soxhlet extraction method, whereby $LiMn_{1-x}M_xPO_4$ and the carbon material can be extracted. In the Soxhlet extraction method, by using NMP as a solvent, the high-molecular material can be removed from the electrode. By oxidizing the carbon material with oxygen, ozone, or the like from a mixture of $LiMn_{1-x}M_xPO_4$ and the carbon material obtained by the Soxhlet extraction method and removing it as carbon dioxide, only $LiMn_{1-x}M_xPO_4$ can be extracted.

According to this embodiment, when used for a secondary battery, an active material for batteries having excellent charge/discharge performance can be obtained.

(Second Embodiment)

Figure 1:
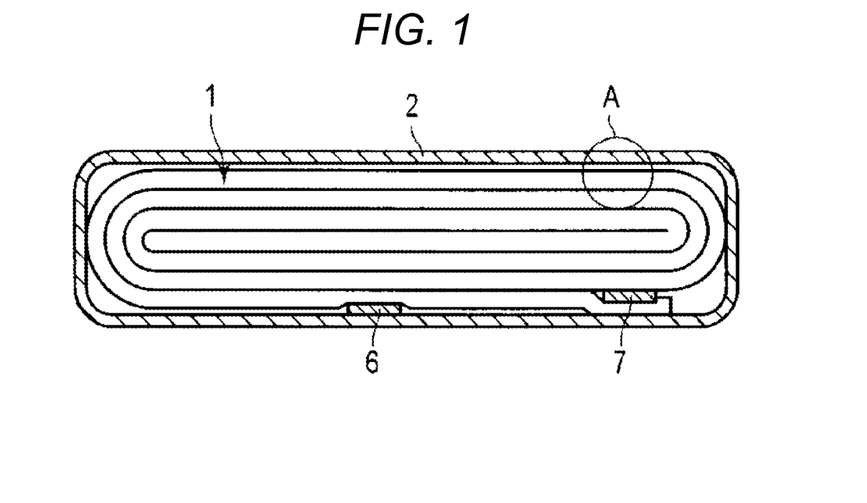
FIG. 1 is a cross-sectional view of a nonaqueous electrolyte battery according to a second embodiment.

Next, a nonaqueous electrolyte battery according to a second embodiment is more specifically described by reference to FIGS. 1 and 2. FIG. 1 is a cross-sectional view of a nonaqueous electrolyte battery according to the second embodiment, and FIG. 2 is an enlarged cross-sectional view of a part A of FIG. 1.

A coil electrode group 1 having a flat form is accommodated in a case 2 made of a laminate film obtained by interposing a metal layer between two resin films. The coil electrode group 1 having a flat form is formed by spirally coiling a laminate obtained by laminating a negative electrode 3, a separator 4, a positive electrode 5, and a separator 4 in this order from the outside and then press-molding the coiled laminate. As shown in FIG. 2, the outermost negative electrode 3 has a structure in which a negative electrode layer 3b containing a negative electrode active material is formed on one of the inside surfaces of a negative electrode current collector 3a. Other negative electrodes 3 have a structure in which the negative electrode layer 3b is formed on both surfaces of the negative electrode current collector 3a. In the positive electrode 5, a positive electrode layer 5b is formed on both surfaces of a positive electrode current collector 5a.

A negative electrode terminal 6 is connected with the negative electrode current collector 3a of the outermost negative electrode 3, and a positive electrode terminal 7 is connected with the positive electrode current collector 5a of the inside positive electrode 5 in the vicinity of the outer peripheral end of the coil electrode group 1. The negative electrode terminal 6 and positive electrode terminal 7 are externally extended from an opening part of the case 2. A liquid nonaqueous electrolyte is, for example, injected through the opening part of the case 2. The opening part of the case 2 is subjected to heat sealing while sandwiching the negative electrode terminal 6 and the positive electrode terminal 7 therebetween, thereby completely hermetically sealing the coil electrode group 1 and the liquid nonaqueous electrolyte.

Figure 2:
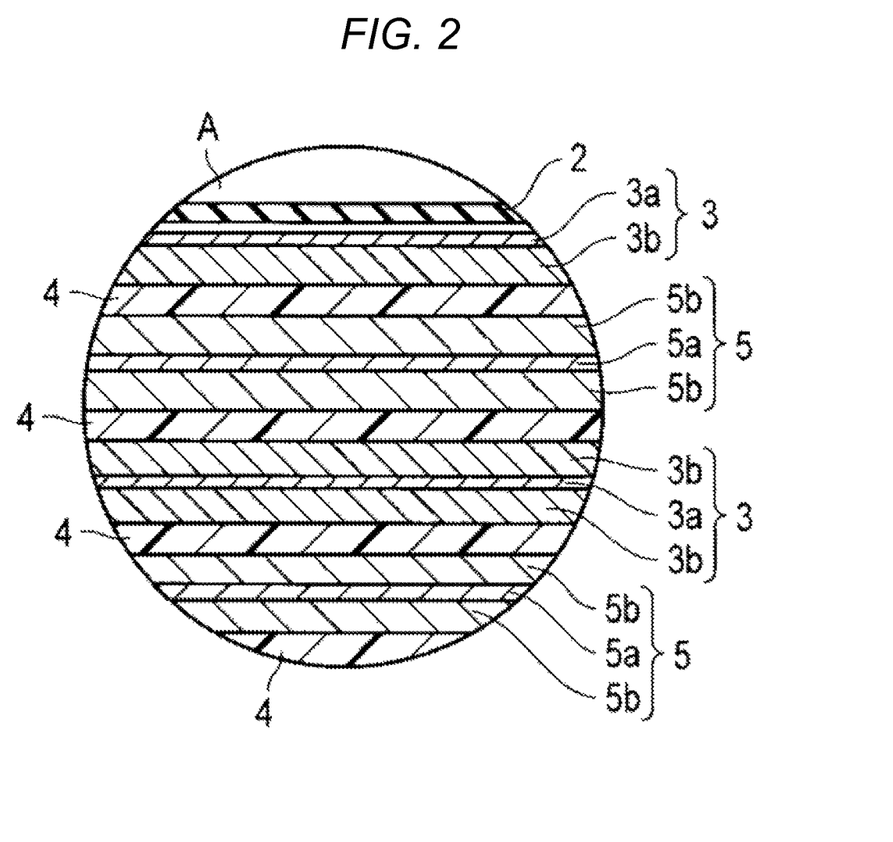
FIG. 2 is an enlarged cross-sectional view of a part A of FIG. 1.
Figure 3:
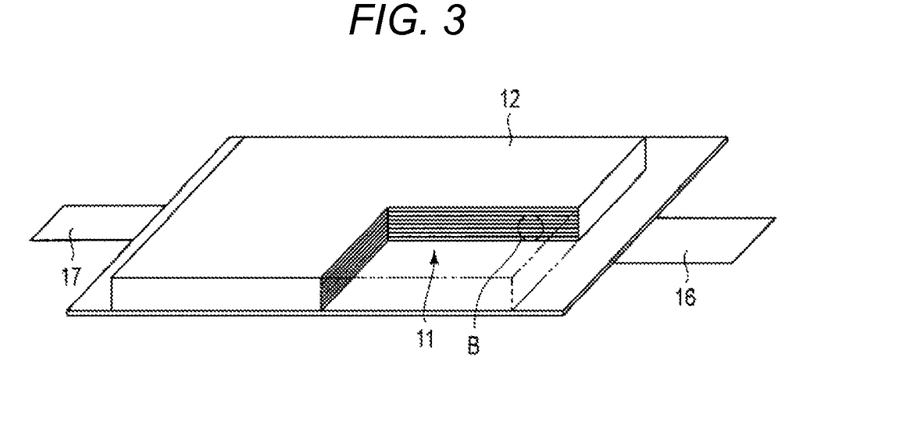
FIG. 3 is a partially broken perspective view schematically showing another nonaqueous electrolyte battery according to the second embodiment.
Figure 4:
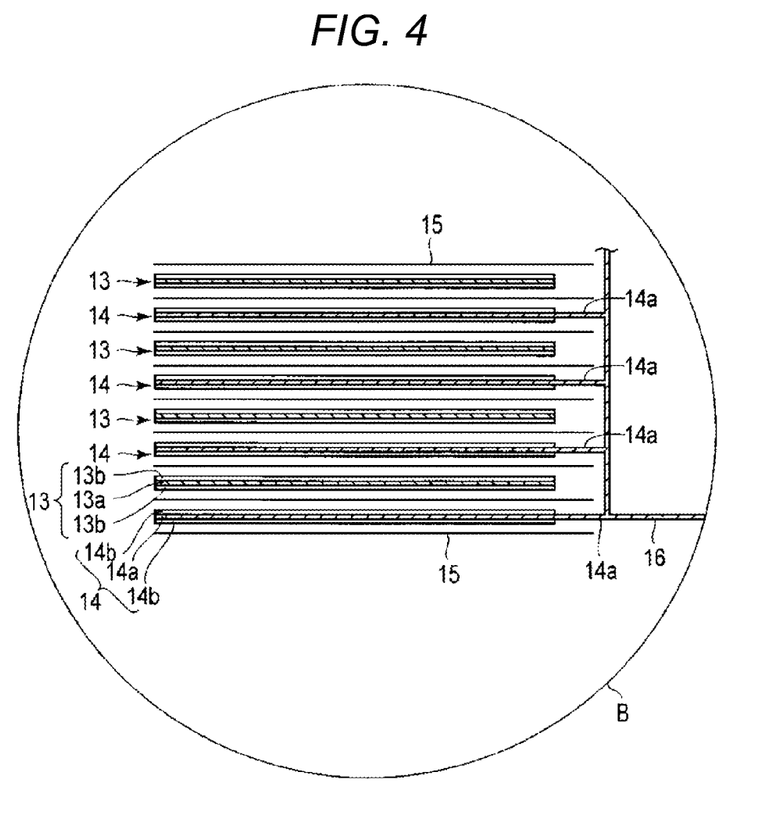
FIG. 4 is an enlarged cross-sectional view of a part B of FIG. 3.

Other nonaqueous electrolyte batteries according to the second embodiment are not limited to the structure shown in the above-described FIGS. 1 and 2 and may be a battery having a structure shown in, for example, FIGS. 3 and 4. FIG. 3 is a partially broken perspective view schematically showing another flat type nonaqueous electrolyte battery according to the second embodiment, and FIG. 4 is an enlarged cross-sectional view of a part B of FIG. 3.

A laminate electrode group 11 is accommodated in a case 12 made of a laminate film produced by interposing a metal layer between two resin films. As shown in FIG. 4, the laminate electrode group 11 has a structure in which a positive electrode 13 and a negative electrode 14 are alternately laminated while interposing a separator 15 therebetween. A plurality of positive electrodes 13 are provided, and each positive electrode 13 is provided with a current collector 13a and a positive electrode layer 13b carried on both surfaces of the current collector 13a. A plurality of negative electrodes 14 are provided, and each negative electrode 14 is provided with a current collector 14a and a negative electrode layer 14b carried on both surfaces of the current collector 14a. One side of the current collector 14a of each negative electrode 14 is projected from the positive electrode 13. The projected current collector 14a is electrically connected with a band-like negative electrode terminal 16. An end of the band-like negative electrode terminal 16 is externally extended from the case 12. Though illustration is omitted, the side of the current collector 13a of the positive electrode 13, which is positioned opposite to the side from which the current collector 14a is projected, is projected from the negative electrode 14. The current collector 13a projected from the negative electrode 14 is electrically connected with a band-like positive electrode terminal 17. An end of the band-like positive electrode terminal 17 is positioned on the side opposite to the negative electrode terminal 16 and externally extended from the side of the case 12.

The negative electrode, the positive electrode, the non-aqueous electrolyte, the separator, the case, the positive electrode terminal, and the negative electrode terminal, each of which is used in the nonaqueous electrolyte battery according to this embodiment, are hereunder described in detail.

(Negative Electrode)

The negative electrode has a negative electrode current collector and a negative electrode material layer carried on one or both surfaces of the current collector and containing an active material, a conductive agent, and a binder.

The negative electrode active material contains a lithium titanium oxide. Examples of the lithium titanium oxide include a lithium titanium oxide having a spinel structure represented by $Li_{4/3+x}Ti_{5/3}O_4$ (0≤x≤1); a titanium oxide having a bronze structure (B) or an anatase structure represented by $Li_xTiO_2$ (0≤x≤1) (the composition before the charge is $TiO_2$); a niobium titanium oxide represented by $Li_xNb_aTiO_7$ (0≤x, and a more preferred range thereof is 0≤x≤1; and 1≤a≤4); and $Li_{2+x}Ti_3O_7$ (0≤x≤1), $Li_{1+x}Ti_2O_4$ (0≤x≤1), $Li_{1.1+x}Ti_{1.8}O_4$ (0≤x≤1), and $Li_{1.07+x}Ti_{1.86}O_4$ (0≤x≤1), each having a ramsdelite structure. The titanium oxide represented by $Li_xTiO_2$ is preferably $TiO_2$ having an anatase structure or $TiO_2(B)$ having a bronze structure, and a low crystalline titanium oxide having a heat treatment temperature of from 300 to 600° C. is also preferable. A material in which a part of Ti of a lithium titanium oxide is substituted with at least one element selected from the group consisting of Nb, Mo, W, P, V, Sn, Cu, Ni, and Fe can also be used.

An average particle diameter of the primary particle of the negative electrode active material is preferably regulated to be in the range of 0.001 μm or more and not more than 1 μm. In addition, as for the particle shape, a good performance is obtained even when it is any form of a granule or a fiber. In the case of a fibrous form, a fiber diameter is preferably not more than 0.1 μm.

It is desirable that the negative electrode active material has an average particle diameter of not more than 1 μm and a specific surface area by the BET method by means of $N_2$ adsorption in the range of from 3 to 200 m²/g. According to this, the affinity of the negative electrode with the nonaqueous electrolyte can be more increased.

A specific surface area by the BET method of the negative electrode material layer (exclusive of the current collector) can be regulated to 3 m²/g or more and not more than 50 m²/g. The specific surface area is more preferably in the range of 5 m²/g or more and not more than 50 m²/g.

It is desirable to regulate a porosity of the negative electrode (exclusive of the current collector) to the range of from 20 to 50%. According to this, a negative electrode having excellent affinity with the nonaqueous electrolyte and having a high density can be obtained. The porosity is more preferably in the range of from 25 to 40%.

The negative electrode current collector is desirably an aluminum foil or an aluminum alloy foil.

A thickness of the aluminum foil or the aluminum alloy foil is preferably not more than 20 μm, and more preferably not more than 15 μm. A purity of the aluminum foil is preferably 99.99% by mass or more. The aluminum alloy is preferably an alloy containing an element such as magnesium, zinc, and silicon. Meanwhile, a content of a transition metal such as iron, copper, nickel, and chromium is preferably not more than 100 ppm by mass.

As the conductive agent, for example, acetylene black, carbon black, coke, carbon fiber, graphite, a metallic compound powder, and a metallic powder can be used solely or in admixture. More specifically, examples thereof include coke, graphite, acetylene black, and a metallic powder such as TiO, TiC, TiN, Al, Ni, Cu, and Fe, each having a heat treatment temperature of from 800° C. to 2,000° C. and an average particle diameter of not more than 10 μm.

Examples of the binder include polytetrafluoroethylene (PTFE), polyvinylidene fluoride (PVdF), a fluorine-based rubber, an acrylic rubber, a styrene butadiene rubber, and a core/shell binder.

A blending ratio of the active material, the conductive agent, and the binder of the negative electrode is preferably in the range of from 80 to 95% by mass for the negative electrode active material, from 1 to 18% by mass for the conductive agent, and from 2 to 7% by mass for the binder, respectively.

The negative electrode can be, for example, fabricated by the following method. First of all, the negative electrode active material, the conductive agent, and the binder are suspended in a solvent to prepare a slurry. This slurry is applied on one or both surfaces of the negative electrode current collector and then dried to form the negative electrode active material layer, followed by pressing. Alternatively, the negative electrode active material, the conductive agent, and the binder are formed in a pellet form, and the resultant can be used as the negative electrode active material layer.

(Positive Electrode)

The positive electrode is provided with a current collector and a positive electrode active material-containing layer (positive electrode material layer) formed on one or both surfaces of this current collector and containing an active material, a conductive agent, and a binder.

In the nonaqueous electrolyte battery in this embodiment, the positive electrode active material according to the above-described first embodiment is used as the positive electrode active material. A variety of oxides may be included.

Examples of the oxide which can be used include manganese dioxide ($MnO_2$), iron oxide, copper oxide, and nickel oxide, each of which absorbs lithium; and a lithium manganese complex oxide (for example, $Li_xMn_2O_4$ or $Li_xMnO_2$), a lithium nickel complex oxide (for example, $Li_xNiO_2$), a lithium cobalt complex oxide (for example, $Li_xCoO_2$), a lithium nickel cobalt complex oxide (for example, $LiNi_{1-y}Co_yO_2$), a lithium manganese cobalt complex oxide (for example, $Li_xMn_yCo_{1-y}O_2$), a spinel type lithium manganese nickel complex oxide (for example, $Li_xMn_{2-y}Ni_yO_4$), a lithium phosphorus oxide having an olivine structure (for example, $Li_xFePO_4$, $Li_xFe_{1-y}Mn_yPO_4$, or $Li_xCoPO_4$), an iron sulfate (for example, $Fe_2(SO_4)_3$), and a vanadium oxide (for example, $V_2O_5$). Here, it is preferable that x and y are satisfied with the relations of 0<x≤1 and 0≤y≤1.

Examples of the polymer which can be used include conductive polymer materials such as polyaniline and polypyrrole; and disulfide-based polymer materials. Sulfur (S) or carbon fluoride can also be used as the active material.

Preferred examples of the active material include a lithium manganese complex oxide (for example, $Li_xMn_2O_4$), a lithium nickel complex oxide (for example, Li$_x$NiO$_2$), a lithium cobalt complex oxide (for example, Li$_x$CoO$_2$), a lithium nickel cobalt complex oxide (for example, Li$_x$Ni$_{1-y}$Co$_y$O$_2$), a spinel type lithium manganese nickel complex oxide (for example, Li$_x$Mn$_{2-y}$Ni$_y$O$_4$), a lithium manganese cobalt complex oxide (for example, Li$_x$Mn$_y$Co$_{1-y}$O$_2$), and a lithium iron phosphate (for example, Li$_x$FePO$_4$), each of which has a high positive electrode voltage. Here, it is preferable that x and y are satisfied with the relations of 0<x≤1 and 0≤y≤1.

The active material is more preferably a lithium cobalt complex oxide or a lithium manganese complex oxide. These active materials have high ion conductivity. Therefore, in its combination with the negative electrode active material composed of the active material according to the first embodiment, the diffusion of a lithium ion in the positive electrode active material hardly becomes a rate-determining step. For this reason, the above-described active material is excellent in adaptability with the negative electrode active material composed of the active material according to the first embodiment.

The conductive agent increases a current-collecting performance of the active material and restrains the contact resistance between the active material and the current collector. Examples of the conductive agent include carbonaceous materials such as acetylene black, carbon black, and graphite.

The binder binds the active material with the conductive agent. Examples of the binder include polytetrafluoroethylene (PTFE), polyvinylidene fluoride (PVdF), and a fluorine-based rubber.

The active material, the conductive agent, and the binder in the positive electrode active material-containing layer are preferably blended in proportions of 80% by mass or more and not more than 95% by mass, 3% by mass or more and not more than 18% by mass, and 2% by mass or more and not more than 17% by mass, respectively. When the amount of the conductive agent is 3% by mass or more, the above-described effects can be exhibited. When the amount of the conductive agent is not more than 18% by mass, the decomposition of the nonaqueous electrolyte on the surface of the conductive agent under high-temperature storage can be decreased. When the amount of the binder is 2% by mass or more, sufficient positive electrode strength is obtained. When the amount of the binder is not more than 17% by mass, the blending amount of the binder that is an insulating material in the positive electrode is decreased, whereby the internal resistance can be decreased.

The current collector is preferably made of, for example, an aluminum foil or an aluminum alloy foil containing an element such as Mg, Ti, Zn, Mn, Fe, Cu, and Si.

The positive electrode is, for example, fabricated by suspending the active material, the conductive agent, and the binder in a general-purpose solvent to prepare a slurry, and applying this slurry on the current collector and then drying, followed by pressing. The positive electrode may also be fabricated by forming the active material, the conductive agent, and the binder in a pellet form to prepare a positive electrode active material-containing layer, which is then disposed on the current collector.

(Nonaqueous Electrolyte)

Examples of the nonaqueous electrolyte include a liquid nonaqueous electrolyte prepared by dissolving an electrolyte in an organic solvent; and a gel-like nonaqueous electrolyte prepared by making a complex of a liquid electrolyte and a polymer material.

The liquid nonaqueous electrolyte is preferably prepared by dissolving the electrolyte in a concentration of 0.5 M/L or more and not more than 2.5 M/L in the organic solvent.

Examples of the electrolyte include lithium salts such as lithium perchlorate (LiClO$_4$), lithium hexafluorophosphate (LiPF$_6$), lithium tetrafluoroborate (LiBF$_4$), lithium hexafluoroarsenic (LiAsF$_6$), lithium trifluoromethasulfonate (LiCF$_3$SO$_3$), and bistrifluoromethylsulfonylimide lithium [LiN(CF$_3$SO$_2$)$_2$], and mixtures of these compounds. The electrolyte is preferably one which is scarcely oxidized even at a high potential, and LiPF$_6$ is most preferable.

Examples of the organic solvent include cyclic carbonates such as propylene carbonate (PC), ethylene carbonate (EC), and vinylene carbonate; chain carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); chain ethers such as dimethoxyethane (DME) and diethoxyethane (DEE); γ-butyrolactone (GBL), acetonitrile (AN), and sulfolane (SL). These organic solvents may be used solely or in a form of a mixed solvent.

Examples of the polymer material include polyvinylidene fluoride (PVdF), polyacrylonitrile (PAN), and polyethylene oxide (PEO).

The organic solvent is preferably a mixed solvent prepared by mixing at least two or more members selected from the group consisting of propylene carbonate (PC), ethylene carbonate (EC), and diethyl carbonate (DEC), or a mixed solvent containing γ-butyrolactone (GBL).

(Separator)

Examples of the separator include a porous film containing polyethylene, polypropylene, cellulose, or polyvinylidene fluoride (PVdF), or a nonwoven fabric made of a synthetic resin. The preferred porous film is formed of polyethylene or polypropylene, melts at a fixed temperature, and is able to cut off a current, and therefore, the safety can be enhanced.

(Case)

The case is formed of a laminate film having a thickness of not more than 0.5 mm. In addition, a metal-made container having a thickness of not more than 1.0 mm can be used as the case. The thickness of the metal-made container is more preferably not more than 0.5 mm.

Examples of the shape of the case include a flat type (thin type), a rectangular type, a cylinder type, a coin type, and a button type. Examples of the case include cases for miniature batteries to be mounted in, for example, mobile electronic devices or the like; and cases for large batteries to be mounted on two-wheel or four-wheel vehicles or the like, corresponding to the dimension of the battery.

As the laminate film, a multilayer film prepared by interposing a metal layer between resin layers is used. The metal layer is preferably formed of an aluminum foil or an aluminum alloy foil for the purpose of reducing the weight. Examples of the resin layer which can be used include polymer materials such as polypropylene (PP), polyethylene (PE), nylon, and polyethylene terephthalate (PET). The laminate film can be molded into a case form by sealing it by means of thermal fusion.

The metal-made container is made of aluminum, an aluminum alloy, or the like. The aluminum alloy is preferably an alloy containing an element such as magnesium, zinc, and silicon. In the case where the alloy contains a transition metal such as iron, copper, nickel, and chromium, the amount of the transition metal is preferably not more than 100 ppm by mass.

(Positive Electrode Terminal)

The positive electrode terminal is made of a material which is electrically stable in a potential range of 3.0 V or more and not more than 4.5 V relative to the lithium ion metal and has conductivity. The positive electrode terminal is preferably made of aluminum or an aluminum alloy containing an element such as Mg, Ti, Zn, Mn, Fe, Cu, and Si. In order to decrease the contact resistance with the positive electrode current collector, the positive electrode terminal is preferably made of the same material as that in the positive electrode current collector.

(Negative Electrode Terminal)

The negative electrode terminal is made of a material which is electrically stable in a potential range of 1.0 V or more and not more than 3.0 V relative to the lithium ion metal and has conductivity. The negative electrode terminal is preferably made of aluminum or an aluminum alloy containing an element such as Mg, Ti, Zn, Mn, Fe, Cu, and Si. In order to decrease the contact resistance with the negative electrode current collector, the negative electrode terminal is preferably made of the same material as that in the negative electrode current collector.

According to the above-described embodiment, a nonaqueous electrolyte battery with enhanced input/output properties can be provided.

(Third Embodiment)

A battery pack according to a third embodiment has one or a plurality of the nonaqueous electrolyte batteries (unit cells) of the above-described second embodiment. In the case where the battery pack is provided with plural unit cells, the respective unit cells are electrically connected with each other in series or in parallel.

Such a battery pack is described in detail by reference to FIGS. 5 and 6. The nonaqueous electrolyte battery shown in FIGS. 1 and 3 can be used as the unit cell.

For example, a plurality of unit cells 21 which are configured of the nonaqueous electrolyte battery shown in the above-described FIG. 1 are laminated such that the externally extended negative electrode terminals 6 and positive electrode terminals 7 are arranged in the same direction and fastened with an adhesive tape 22, thereby configuring a battery module 23. These unit cells 21 are electrically connected with each other in series as shown in FIG. 6.

A printed wiring board 24 is disposed facing the side surface of the unit cell 21 from which the negative electrode terminal 6 and the positive electrode terminal 7 are extended. As shown in FIG. 6, a thermistor 25, a protective circuit 26, and an energizing terminal 27 connected with external devices are mounted on the print wiring board 24. An insulating plate (not shown) is installed on the surface of the printed wiring board 24 facing the battery module 23 to avoid unnecessary electrical connection with a wiring of the battery module 23.

A positive electrode lead 28 is connected with the positive electrode terminal 7 positioned on the lowermost layer of the battery module 23, with its end being inserted into a positive electrode connector 29 of the printed wiring board 24 for electrical connection. A negative electrode lead 30 is connected with the negative electrode terminal 6 positioned on the uppermost layer of the battery module 23, with its end being inserted into a negative electrode connector 31 of the printed wiring board 24 for electrical connection. These connectors 29 and 31 are connected with the protective circuit 26 through wirings 32 and 33 formed on the printed wiring board 24.

The thermistor 25 detects a temperature of the unit cell 21, and the detected signals are transmitted to the protective circuit 26. The protective circuit 26 can shut off a plus-side wiring 34a and a minus-side wiring 34b between the protective circuit 26 and the energizing terminal 27 connected with external devices under a predetermined condition. The predetermined condition refers to, for example, the case where the temperature detected by the thermistor 25 reaches a predetermined temperature or higher. In addition, the predetermined condition refers to, for example, the case of detecting overcharge, overdischarge, over-current, or the like of the unit cell 21. The detection of this overcharge or the like is made for the individual unit cells 21 or the entirety of the unit cells 21. In the case of detecting the individual unit cells 21, the voltage of the battery may be detected, or the potential of the positive electrode or negative electrode may be detected. In the latter case, a lithium electrode which is used as a reference electrode is inserted in each unit cell 21. In the case of FIGS. 5 and 6, a wiring 35 for detecting the voltage is connected with each unit cell 21, and the detected signals are transmitted to the protective circuit 26 through these wirings 35.

A protective sheet 36 made of a rubber or a resin is disposed on each of the three side surfaces of the battery module 23 exclusive of the side surface from which the positive electrode terminal 7 and the negative electrode terminal 6 are projected.

The battery module 23 is accommodated in a container 37 together with each protective sheet 36 and the printed wiring board 24. That is, the protective sheet 36 is disposed on the both inside surfaces in the direction of the long side and on one inside surface in the direction of the short side of the container 37, and the printed wiring board 24 is disposed on the opposite inside surface in the direction of the short side. The battery module 23 is positioned in a space surrounded by the protective sheet 36 and the printed wiring board 24. A lid 38 is installed on the upper surface of the container 37.

A thermally contracting tape maybe used in place of the adhesive tape 22 to secure the battery module 23. In that case, after the protective sheet is disposed on the both sides of the battery module, and the thermally contracting tape is wound around the battery module, the thermally contracting tape is contracted by heating, thereby fastening the battery module.

Figure 5:
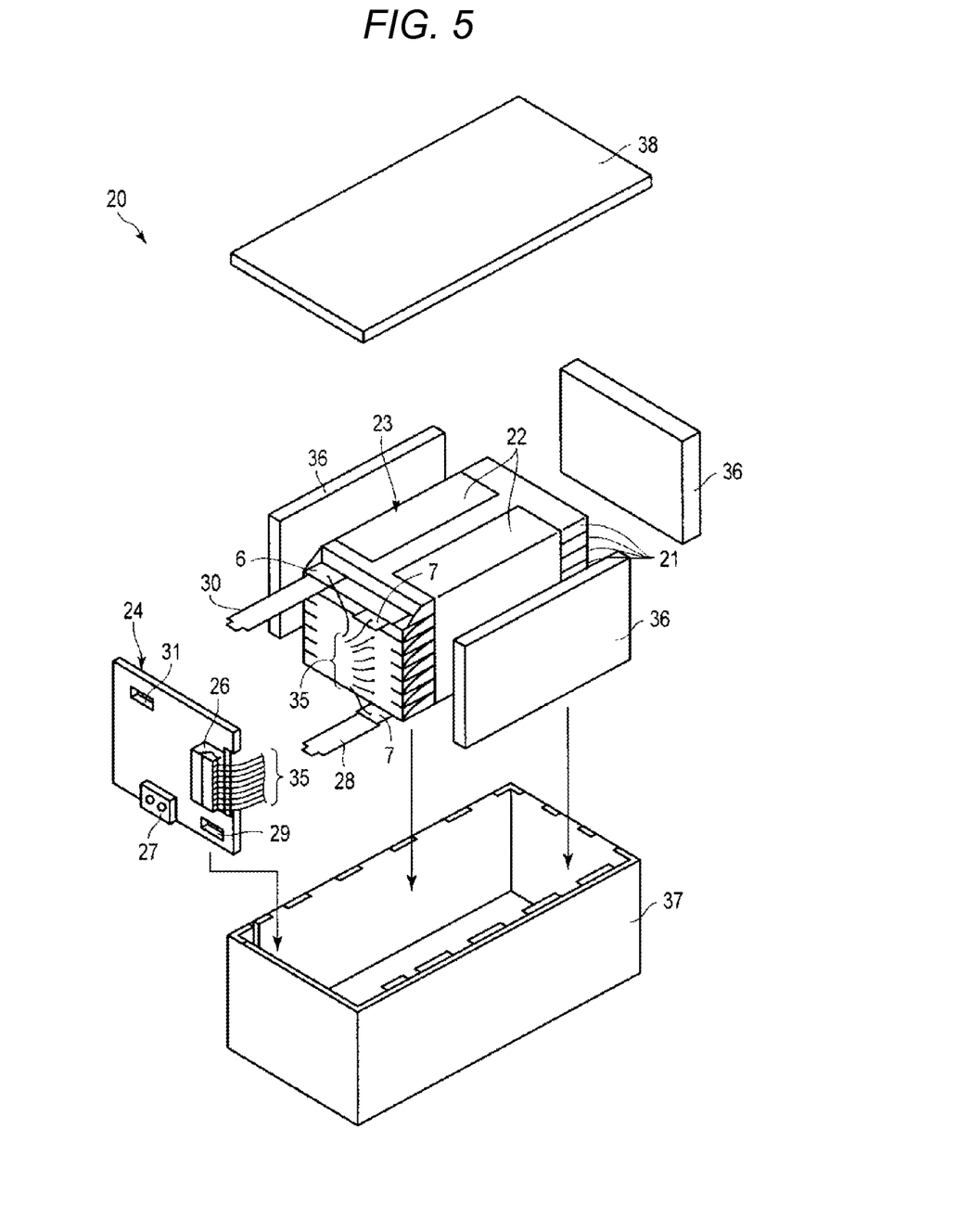
FIG. 5 is an exploded perspective view of a battery pack according to a third embodiment.
Figure 6:
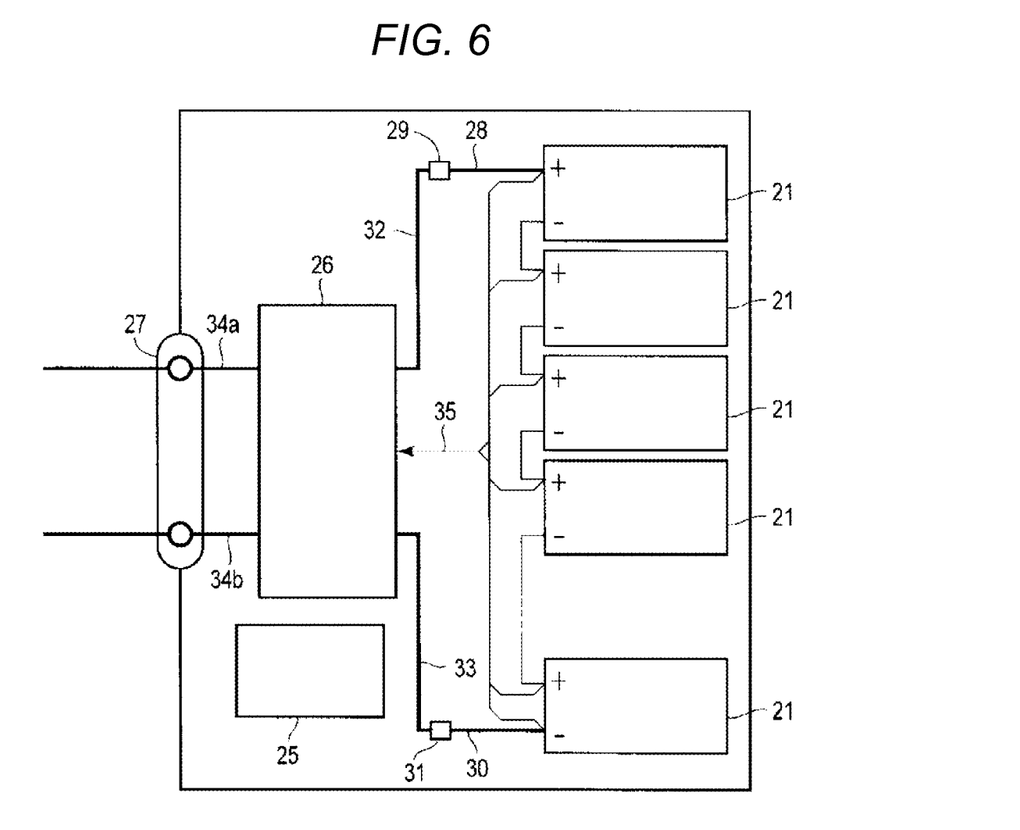
FIG. 6 is a block diagram showing an electric circuit of the battery pack of FIG. 5.

The structure in which the unit cells 21 are connected in series is shown in FIGS. 5 and 6. However, in order to increase the capacity of the battery, these unit cells 21 may be connected with each other in parallel. The assembled battery packs can also be connected with each other in series or in parallel.

In addition, the structure of the battery pack is appropriately changed according to its use. The battery pack is preferably used in applications required to exhibit cyclic properties in large-current properties. Specifically, the battery pack is used as power sources for digital cameras, and batteries mounted on vehicles such as two- or four-wheel hybrid electric cars, two- or four-wheel electric cars, and power-assisted bicycles. In particular, the battery pack is suitably used for batteries mounted on vehicles.

By using a mixed solvent prepared by mixing at least two or more members selected from the group consisting of propylene carbonate (PC), ethylene carbonate (EC), and diethyl carbonate (DEC), or a nonaqueous electrolyte containing γ-butyrolactone (GBL), a nonaqueous electrolyte battery having excellent high-temperature properties can be obtained. In particular, the battery pack provided with a battery module having a plurality of such nonaqueous electrolyte batteries is suitably used for batteries mounted on vehicles.

According to the third embodiment, the nonaqueous electrolyte battery according to the second embodiment is included, and therefore, a battery pack which is excellent in terms of initial capacity, large-current performance, and life performance can be realized.

EXAMPLES

Examples of the present embodiments are hereunder described. It should be construed that this invention is not limited to the following Examples with the intended scope of the invention only being limited by the appended claims.

Example 1

Lithium phosphate ($Li_3PO_4$), manganese sulfate pentahydrate ($MnSO_4 \cdot 5H_2O$), iron sulfate heptahydrate ($FeSO_4 \cdot 7H_2O$), and carboxymethyl cellulose sodium were dissolved in pure water in a nitrogen atmosphere. At that time, a molar ratio of the dissolved metals was set up to the following ratio.

Li/Mn/Fe=3/0.9/0.1

The solution having the above-described starting materials dissolved therein was provided in an autoclave, and after hermetically sealing the autoclave, the solution was subjected to a heat treatment at 200° C. for 3 hours while stirring. After the heat treatment, a sample was extracted by means of centrifugation, and in order to prevent coagulation of a powder of the sample from occurring, the sample was dried by means of freeze drying and then collected.

The collected sample was subjected to a heat treatment at 700° C. for one hour in an argon atmosphere, thereby obtaining $LiMn_{0.9}Fe_{0.1}PO_4$ having an average pore diameter and a total pore volume shown in Table 1. A method of measuring the average pore diameter and total pore volume is described above.

<Fabrication of Cell for Evaluation>

A positive electrode containing $LiMn_{0.9}Fe_{0.1}PO_4$ and a Li metal as a counter electrode were made opposite to each other via a glass filter (separator) in dry argon, and a lithium metal was inserted as a reference electrode so as to not come into contact with the positive electrode and the Li metal as the counter electrode. These members were put in a three-electrode glass cell; the positive electrode, the counter electrode, and the reference electrode were connected with terminals of the glass cell, respectively; an electrolyte was injected; and the glass container was hermetically sealed in a state where the separator and the electrodes were thoroughly impregnated with the electrolyte. A solution prepared by dissolving 1.0 mole/L of $LiPF_6$ as a lithium salt in a mixed solvent of ethylene carbonate (EC) and diethyl carbonate (DEC) in a volume ratio of 1/2 was used as the electrolyte.

<Charge/Discharge Test>

The fabricated cell was used and subjected to a charge/discharge test in an environment at 25° C. A charge/discharge rate was 0.1 C, and a voltage range was set up to from 2.0 to 4.5 V.

<Charge/Discharge Test>

The fabricated cell for evaluation was used and subjected to a charge/discharge test in an environment at 25° C. A cycle test was performed at 25° C.; the charge was performed in a constant current/constant voltage mode; a charge rate was 0.1 C; and a charge potential was 4.5 V vs. Li/Li$^+$; and a charge termination condition was set up to 20 hours or 0.01 C cut-off. The discharge was performed in a constant current mode, a discharge rate was 0.1 C, and a discharge termination condition was 2.0 V vs. Li/Li$^+$. A discharge capacity (mAh/g) was determined from the obtained results.

Example 2

A positive electrode active material of $LiMn_{0.9}Mg_{3.1}PO_4$ having an average pore diameter and a total pore volume shown in Table 1 was obtained in the same manner as that in Example 1, except for using, as the raw materials, lithium phosphate ($Li_3PO_4$), manganese sulfate pentahydrate ($MnSO_4 \cdot 5H_2O$), magnesium sulfate heptahydrate ($MgSO_4 \cdot 7H_2O$), and carboxymethyl cellulose sodium.

By using the resulting positive electrode active material, a cell for evaluation was fabricated in the same manner as that in Example 1, and the charge/discharge test was performed. The obtained results are shown in Table 1.

Example 3

A positive electrode active material of $LiMn_{0.9}Ni_{0.1}PO_4$ having an average pore diameter and a total pore volume shown in Table 1 was obtained in the same manner as that in Example 1, except for using, as the raw materials, lithium phosphate ($Li_3PO_4$), manganese sulfate pentahydrate ($MnSO_4 \cdot 5H_2O$), nickel sulfate hexahydrate ($NiSO_4 \cdot 6H_2O$), and carboxymethyl cellulose sodium.

By using the resulting positive electrode active material, a cell for evaluation was fabricated in the same manner as that in Example 1, and the charge/discharge test was performed. The obtained results are shown in Table 1.

Example 4

A positive electrode active material of $LiMn_{0.9}Co_{0.1}PO_4$ having an average pore diameter and a total pore volume shown in Table 1 was obtained in the same manner as that in Example 1, except for using, as the raw materials, lithium phosphate ($Li_3PO_4$), manganese sulfate pentahydrate ($MnSO_4 \cdot 5H_2O$), cobalt sulfate monohydrate ($CoSO_4 \cdot H_2O$), and carboxymethyl cellulose sodium.

By using the resulting positive electrode active material, a cell for evaluation was fabricated in the same manner as that in Example 1, and the charge/discharge test was performed. The obtained results are shown in Table 1.

Example 5

A positive electrode active material of $LiMn_{0.9}Ti_{0.1}PO_4$ having an average pore diameter and a total pore volume shown in Table 1 was obtained in the same manner as that in Example 1, except for using, as the raw materials, lithium phosphate ($Li_3PO_4$), manganese sulfate pentahydrate ($MnSO_4 \cdot 5H_4O$), titanium tetrapropoxide ($Ti(i-C_3H_7O)_4$), and carboxymethyl cellulose sodium.

By using the resulting positive electrode active material, a cell for evaluation was fabricated in the same manner as that in Example 1, and the charge/discharge test was performed. The obtained results are shown in Table 1.

Example 6

A positive electrode active material of $LiMn_{0.9}Zr_{0.1}PO_4$ having an average pore diameter and a total pore volume shown in Table 1 was obtained in the same manner as that in Example 1, except for using, as the raw materials, lithium phosphate (Li$_3$PO$_4$), manganese sulfate pentahydrate (MnSO$_4$.5H$_4$O), zirconium butoxide (Zr(C$_4$H$_9$O)$_4$), and carboxymethyl cellulose sodium.

By using the resulting positive electrode active material, a cell for evaluation was fabricated in the same manner as that in Example 1, and the charge/discharge test was performed. The obtained results are shown in Table 1.

Example 7

A positive electrode active material of LiMnPO$_4$ having an average pore diameter and a total pore volume shown in Table 1 was obtained in the same manner as that in Example 1, except for synthesizing LiMnPO$_4$ by a hydrothermal method by using, as the raw materials, lithium phosphate (Li$_3$PO$_4$), manganese sulfate pentahydrate (MnSO$_4$.5H$_2$O), and carboxymethyl cellulose sodium, pulverizing the resulting LiMnPO$_4$ in ethanol by using a planetary ball mill, and then subjecting the resultant to a heat treatment at 700° C. for one hour. At that time, a molar ratio of the dissolved metals was set up to the following ratio.

Li/Mn=3/1

By using the resulting positive electrode active material, a cell for evaluation was fabricated in the same manner as that in Example 1, and the charge/discharge test was performed. The obtained results are shown in Table 1.

Example 8

A positive electrode active material of LiMnPO$_4$ having an average pore diameter and a total pore volume shown in Table 1 was obtained in the same manner as that in Example 1, except for synthesizing LiMnPO$_4$ by a hydrothermal method by using, as the raw materials, lithium sulfate (Li$_2$SO$_4$), diammonium hydrogen phosphate ((NH$_4$)$_2$HPO$_4$), manganese sulfate pentahydrate (MnSO$_4$.5H$_2$O), and carboxymethyl cellulose sodium, pulverizing the resulting LiMnPO$_4$ in ethanol by using a planetary ball mill, and then subjecting the resultant to a heat treatment at 700° C. for one hour.

By using the resulting positive electrode active material, a cell for evaluation was fabricated in the same manner as that in Example 1, and the charge/discharge test was performed. The obtained results are shown in Table 1.

Example 9

A positive electrode active material of LiMn$_{0.95}$Fe$_{0.05}$PO$_4$ having an average pore diameter and a total pore volume shown in Table 1 was obtained in the same manner as that in Example 1, except for synthesizing LiMn$_{0.95}$Fe$_{0.05}$PO$_4$ by a hydrothermal method by using, as the raw materials, lithium sulfate (Li$_2$SO$_4$), diammonium hydrogen phosphate ((NH$_4$)$_2$HPO$_4$), manganese sulfate pentahydrate (MnSO$_4$.5H$_2$O), iron sulfate heptahydrate (FeSO$_4$.7H$_2$O), and carboxymethyl cellulose sodium, pulverizing the resulting LiMn$_{0.95}$Fe$_{0.05}$PO$_4$ in ethanol by using a planetary ball mill, and then subjecting the resultant to a heat treatment at 700° C. for one hour.

By using the resulting positive electrode active material, a cell for evaluation was fabricated in the same manner as that in Example 1, and the charge/discharge test was performed. The obtained results are shown in Table 1.

Example 10

A positive electrode active material of LiMn$_{0.9}$Fe$_{0.05}$Mg$_{0.05}$PO$_4$ having an average pore diameter and a total pore volume shown in Table 1 was obtained in the same manner as that in Example 1, except for synthesizing LiMn$_{0.9}$Fe$_{0.05}$Mg$_{0.05}$PO$_4$ by a hydrothermal method by using, as the raw materials, lithium sulfate (Li$_2$SO$_4$), diammonium hydrogen phosphate ((NH$_4$)$_2$HPO$_4$), manganese sulfate pentahydrate (MnSO$_4$.5H$_2$O), iron sulfate heptahydrate (FeSO$_4$.7H$_2$O), magnesium sulfate heptahydrate (MgSO$_4$.7H$_2$O), and carboxymethyl cellulose sodium, pulverizing the resulting LiMn$_{0.9}$Fe$_{0.05}$Mg$_{0.05}$PO$_4$ in ethanol by using a planetary ball mill, and then subjecting the resultant to a heat treatment at 700° C. for one hour.

By using the resulting positive electrode active material, a cell for evaluation was fabricated in the same manner as that in Example 1, and the charge/discharge test was performed. The obtained results are shown in Table 1.

Example 11

A positive electrode active material of LiMn$_{0.8}$Fe$_{0.1}$Mg$_{0.1}$PO$_4$ having an average pore diameter and a total pore volume shown in Table 1 was obtained in the same manner as that in Example 1, except for synthesizing LiMn$_{0.8}$Fe$_{0.1}$Mg$_{0.1}$PO$_4$ by a hydrothermal method by using, as the raw materials, lithium sulfate (Li$_2$SO$_4$), diammonium hydrogen phosphate ((NH$_4$)$_2$HPO$_4$), manganese sulfate pentahydrate (MnSO$_4$.5H$_2$O), iron sulfate heptahydrate (FeSO$_4$.7H$_2$O), magnesium sulfate heptahydrate (MgSO$_4$.7H$_2$O) and carboxymethyl cellulose sodium, pulverizing the resulting LiMn$_{0.8}$Fe$_{0.1}$Mg$_{0.1}$PO$_4$ in ethanol by using a planetary ball mill, and then subjecting the resultant to a heat treatment at 700° C. for one hour.

By using the resulting positive electrode active material, a cell for evaluation was fabricated in the same manner as that in Example 1, and the charge/discharge test was performed. The obtained results are shown in Table 1.

Example 12

A positive electrode active material of LiMn$_{0.6}$Fe$_{0.3}$Mg$_{0.1}$PO$_4$ having an average pore diameter and a total pore volume shown in Table 1 was obtained in the same manner as that in Example 1, except for synthesizing LiMn$_{0.6}$Fe$_{0.3}$Mg$_{0.1}$PO$_4$ by a hydrothermal method by using, as the raw materials, lithium sulfate (Li$_2$SO$_4$), diammonium hydrogen phosphate ((NH$_4$)$_2$HPO$_4$), manganese sulfate pentahydrate (MnSO$_4$.5H$_2$O), iron sulfate heptahydrate (FeSO$_4$.7H$_2$O), magnesium sulfate heptahydrate (MgSO4 .7H$_2$O) and carboxymethyl cellulose sodium, pulverizing the resulting LiMn$_{0.6}$Fe$_{0.3}$Mg$_{0.1}$PO$_4$ in ethanol by using a planetary ball mill, and then subjecting the resultant to a heat treatment at 700° C. for one hour.

By using the resulting positive electrode active material, a cell for evaluation was fabricated in the same manner as that in Example 1, and the charge/discharge test was performed. The obtained results are shown in Table 1.

Example 13

A positive electrode active material of LiMn$_{0.55}$Fe$_{0.35}$Mg$_{0.1}$PO$_4$ having an average pore diameter and a total pore volume shown in Table 1 was obtained in the same manner as that in Example 1, except for synthesizing LiMn$_{0.55}$Fe$_{0.35}$Mg$_{0.1}$PO$_4$ by a hydrothermal method by using, as the raw materials, lithium sulfate (Li$_2$SO$_4$), diammonium hydrogen phosphate ((NH$_4$)$_2$HPO$_4$), manganese sulfate pentahydrate (MnSO$_4$.5H$_2$O), iron sulfate heptahydrate (FeSO$_4$.7H$_2$O), magnesium sulfate heptahydrate ($MgSO_4 \cdot 7H_2O$), and carboxymethyl cellulose sodium, pulverizing the resulting $LiMn_{0.55}Fe_{0.35}Mg_{0.1}PO_4$ in ethanol by using a planetary ball mill, and then subjecting the resultant to a heat treatment at 700° C. for one hour.

By using the resulting positive electrode active material, a cell for evaluation was fabricated in the same manner as that in Example 1, and the charge/discharge test was performed. The obtained results are shown in Table 1.

Comparative Example 1

A positive electrode active material of $LiMnPO_4$ having an average pore diameter and a total pore volume shown in Table 2 was obtained in the same manner as that in Example 1, except for using, as the raw materials, lithium phosphate ($Li_3PO_4$), manganese sulfate pentahydrate ($MnSO_4 \cdot 5H_2O$), and carboxymethyl cellulose sodium.

By using the resulting positive electrode active material, a cell for evaluation was fabricated in the same manner as that in Example 1, and the charge/discharge test was performed. The obtained results are shown in Table 2.

Comparative Example 2

A positive electrode active material of $LiMnPO_4$ having an average pore diameter and a total pore volume shown in Table 2 was obtained in the same manner as that in Example 1, except for using, as the raw materials, lithium sulfate ($Li_2SO_4$), lithium hydroxide (LiOH), diammonium hydrogen phosphate (($NH_4)_2HPO_4$), manganese sulfate pentahydrate ($MnSO_4 \cdot 5H_2O$), and carboxymethyl cellulose sodium, setting up a molar ratio of the dissolved metals to Li/Mn=3/1, and setting up a molar ratio of lithium sulfate ($Li_2SO_4$) to lithium hydroxide (LiOH) to 1/4.

By using the resulting positive electrode active material, a cell for evaluation was fabricated in the same manner as that in Example 1, and the charge/discharge test was performed. The obtained results are shown in Table 2.

Comparative Example 3

A positive electrode active material of $LiMn_{0.9}Fe_{0.1}PO_4$ having an average pore diameter and a total pore volume shown in Table 2 was obtained in the same manner as that in Example 1, except for using, as the raw materials, lithium phosphate ($Li_3PO_4$), manganese sulfate pentahydrate ($MnSO_4 \cdot 5H_2O$), iron sulfate heptahydrate ($FeSO_4 \cdot 7H_2O$), and carboxymethyl cellulose sodium and after the synthesis, subjecting the resultant to a heat treatment at 800° C. for 5 hours in an argon atmosphere.

By using the resulting positive electrode active material, a cell for evaluation was fabricated in the same manner as that in Example 1, and the charge/discharge test was performed. The obtained results are shown in Table 2.

Comparative Example 4

A positive electrode active material of $LiMn_{0.9}Fe_{0.1}PO_4$ having an average pore diameter and a total pore volume shown in Table 2 was obtained in the same manner as that in Example 1, except for using, as the raw materials, lithium hydroxide (LiOH), phosphoric acid ($H_3PO_4$), manganese sulfate pentahydrate ($MnSO_4 \cdot 5H_4O$), iron sulfate heptahydrate ($FeSO_4 \cdot 7H_2O$), and carboxymethyl cellulose sodium.

By using the resulting positive electrode active material, a cell for evaluation was fabricated in the same manner as that in Example 1, and the charge/discharge test was performed. The obtained results are shown in Table 2.

Comparative Example 5

A positive electrode active material of $LiMn_{0.9}Fe_{0.1}PO_4$ having an average pore diameter and a total pore volume shown in Table 2 was obtained in the same manner as that in Example 1, except for using, as the raw materials, lithium hydroxide (LiOH), phosphoric acid ($H_3PO_4$), manganese sulfate pentahydrate ($MnSO_4 \cdot 5H_2O$), iron sulfate heptahydrate ($FeSO_4 \cdot 7H_2O$), and carboxymethyl cellulose sodium, pulverizing the resulting $LiMn_{0.9}Fe_{0.1}PO_4$ in ethanol by using a planetary ball mill, and then subjecting the resultant to a heat treatment at 700° C. for one hour.

By using the resulting positive electrode active material, a cell for evaluation was fabricated in the same manner as that in Example 1, and the charge/discharge test was performed. The obtained results are shown in Table 2.

Comparative Example 6

A positive electrode active material of $LiMn_{0.9}Fe_{0.05}Mg_{0.05}PO_4$ having an average pore diameter and a total pore volume shown in Table 2 was obtained in the same manner as that in Example 1, except for using, as the raw materials, lithium hydroxide (LiOH), phosphoric acid ($H_3PO_4$), manganese sulfate pentahydrate ($MnSO_4 \cdot 5H_2O$), iron sulfate heptahydrate ($FeSO_4 \cdot 7H_2O$), magnesium sulfate heptahydrate ($MgSO_4 \cdot 7H_2O$), and carboxymethyl cellulose sodium.

By using the resulting positive electrode active material, a cell for evaluation was fabricated in the same manner as that in Example 1, and the charge/discharge test was performed. The obtained results are shown in Table 2.

Comparative Example 7

A positive electrode active material of $LiMn_{0.3}Fe_{0.1}Mg_{0.1}PO_4$ having an average pore diameter and a total pore volume shown in Table 2 was obtained in the same manner as that in Example 1, except for using, as the raw materials, lithium hydroxide (LiOH), phosphoric acid ($H_3PO_4$), manganese sulfate pentahydrate ($MnSO_4 \cdot 5H_2O$), iron sulfate heptahydrate ($FeSO_4 \cdot 7H_2O$), magnesium sulfate heptahydrate ($MgSO_4 \cdot 7H_2O$), and carboxymethyl cellulose sodium.

By using the resulting positive electrode active material, a cell for evaluation was fabricated in the same manner as that in Example 1, and the charge/discharge test was performed. The obtained results are shown in Table 2.

Comparative Example 8

A positive electrode active material of $LiMn_{0.6}Fe_{0.3}Mg_{0.1}PO_4$ having an average pore diameter and a total pore volume shown in Table 2 was obtained in the same manner as that in Example 1, except for using, as the raw materials, lithium hydroxide (LiOH), phosphoric acid ($H_3PO_4$), manganese sulfate pentahydrate ($MnSO_4 \cdot 5H_2O$), iron sulfate heptahydrate ($FeSO_4 \cdot 7H_2O$), magnesium sulfate heptahydrate ($MgSO_4 \cdot 7H_2O$), and carboxymethyl cellulose sodium.

By using the resulting positive electrode active material, a cell for evaluation was fabricated in the same manner as that in Example 1, and the charge/discharge test was performed. The obtained results are shown in Table 2.

Comparative Example 9

A positive electrode active material of $LiMn_{0.55}Fe_{0.35}Mg_{0.1}PO_4$ having an average pore diameter and a total pore volume shown in Table 2 was obtained in the same manner as that in Example 1, except for using, as the raw materials, lithium hydroxide (LiOH), phosphoric acid ($H_3PO_4$), manganese sulfate pentahydrate ($MnSO_4 \cdot 5H_2O$), iron sulfate heptahydrate ($FeSO_4 \cdot 7H_2O$), magnesium sulfate heptahydrate ($MgSO_4 \cdot 7H_2O$), and carboxymethyl cellulose sodium.

By using the resulting positive electrode active material, a cell for evaluation was fabricated in the same manner as that in Example 1, and the charge/discharge test was performed. The obtained results are shown in Table 2.

TABLE 1

| | Positive Electrode Active Material | Average Pore Diameter (nm) | Total Pore Volume ($cm^3/g$) | Discharge Capacity (mAh/g) |
|---|---|---|---|---|
| Example 1 | $LiMn_{0.9}Fe_{0.1}PO_4$ | 10.48 | 0.0607 | 136 |
| Example 2 | $LiMn_{0.9}Mg_{0.1}PO_4$ | 8.171 | 0.0715 | 127 |
| Example 3 | $LiMn_{0.9}Ni_{0.1}PO_4$ | 11.66 | 0.0606 | 122 |
| Example 4 | $LiMn_{0.9}Co_{0.1}PO_4$ | 12.71 | 0.0588 | 125 |
| Example 5 | $LiMn_{0.9}Ti_{0.1}PO_4$ | 9.95 | 0.0525 | 119 |
| Example 6 | $LiMn_{0.9}Zr_{0.1}PO_4$ | 11.4 | 0.0536 | 117 |
| Example 7 | $LiMnPO_4$ | 18.45 | 0.264 | 148 |
| Example 8 | $LiMnFePO_4$ | 17.72 | 0.199 | 141 |
| Example 9 | $LiMn_{0.95}Fe_{0.05}PO_4$ | 15.11 | 0.164 | 140 |
| Example 10 | $LiMn_{0.9}Fe_{0.05}Mg_{0.05}PO_4$ | 24.81 | 0.236 | 142 |
| Example 11 | $LiMn_{0.8}Fe_{0.1}Mg_{0.1}PO_4$ | 21.55 | 0.192 | 148 |
| Example 12 | $LiMn_{0.6}Fe_{0.3}Mg_{0.1}PO_4$ | 15.73 | 0.106 | 152 |
| Example 13 | $LiMn_{0.55}Fe_{0.35}Mg_{0.1}PO_4$ | 16.16 | 0.112 | 155 |

TABLE 2

| | Positive Electrode Active Material | Average Pore Diameter (nm) | Total Pore Volume ($cm^3/g$) | Discharge Capacity (mAh/g) |
|---|---|---|---|---|
| Comparative Example 1 | $LiMnPO_4$ | 25.38 | 0.0481 | 108 |
| Comparative Example 2 | $LiMnPO_4$ | 27.82 | 0.0456 | 56 |
| Comparative Example 3 | $LiMn_{0.9}Fe_{0.1}PO_4$ | 7.88 | 0.0394 | 95 |
| Comparative Example 4 | $LiMn_{0.9}Fe_{0.1}PO_4$ | 7.79 | 0.0458 | 89 |
| Comparative Example 5 | $LiMn_{0.9}Fe_{0.1}PO_4$ | 25.45 | 0.315 | 94 |
| Comparative Example 6 | $LiMn_{0.9}Fe_{0.05}Mg_{0.05}PO_4$ | 7.3 | 0.0442 | 94 |
| Comparative Example 7 | $LiMn_{0.8}Fe_{0.1}Mg_{0.1}PO_4$ | 7.14 | 0.0477 | 99 |
| Comparative Example 8 | $LiMn_{0.6}Fe_{0.3}Mg_{0.1}PO_4$ | 7.66 | 0.0456 | 105 |
| Comparative Example 9 | $LiMn_{0.55}Fe_{0.35}Mg_{0.1}PO_4$ | 7.83 | 0.0419 | 108 |

As is clear from Examples 1 to 13 shown in Table 1 and Comparative Examples 1 to 9 shown in Table 2, the positive electrode active materials of the present Examples have a good discharge capacity and have excellent charge/discharge properties.

Figure 7:
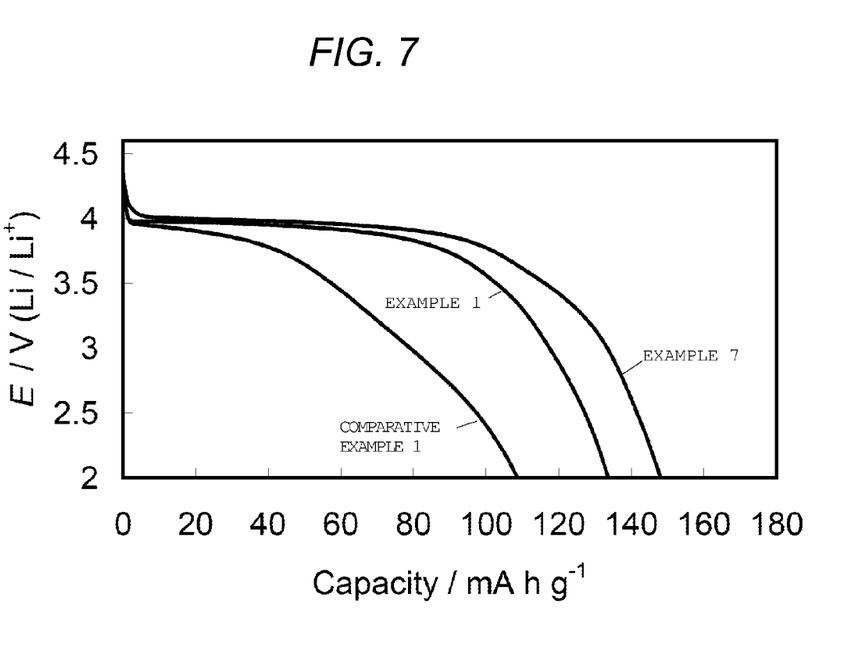
FIG. 7 is a discharge curve of each of Example 1, Example 7, and Comparative Example 1.

In addition, a discharge curve of each of Example 1, Example 7, and Comparative Example 1 is shown in FIG. 7.

As is clear from FIG. 7, the positive electrode active materials of the present Examples are small in overvoltage and have a large discharge capacity as compared with the Comparative Example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A positive electrode active material, comprising $LiMn_{1-x}M_xPO_4$ (wherein M represents at least one element selected from Mg, Fe, Ni, Co, Ti, and Zr, and $0 \leq x < 0.5$) and having an average pore diameter of 8 nm or more and not more than 25 nm and a total pore volume of 0.05 $cm^3/g$ or more and not more than 0.3 $cm^3/g$, wherein the average pore diameter and the total pore volume are measured by a nitrogen gas adsorption method, and
wherein the positive electrode active material comprises a primary particle and a second particle haveing primary particles aggregated therein and comprises a carbonaceous material on a surface of the primary particle and in an interior of the secondary particle.

2. The positive electrode active material of claim 1, wherein a specific surface area of the positive electrode active material is 5 $m^2/g$ or more and not more than 100 $m^2/g$.

3. The positive electrode active material of claim 2, wherein the positive electrode active material is $LiMn_{1-a-b}Fe_aMg_bPO_4$ ($0 < a \leq 0.25$ and $0 < b \leq 0.15$).

4. A nonaqueous electrolyte battery, comprising:
a negative electrode comprising a negative electrode active material,
a positive electrode comprising the positive electrode active material of claim 3; and
a nonaqueous electrolyte.

5. A nonaqueous electrolyte battery, comprising:
a negative electrode comprising a negative electrode active material,
a positive electrode comprising the positive electrode active material of claim 2; and
a nonaqueous electrolyte.

6. The positive electrode active material of cl aim 1, wherein the positive electrode active material is $LiMn_{1-a-b}Fe_aMg_bPO_4$ ($0 < a \leq 0.25$ and $0 < b \leq 0.15$).

7. A nonaqueous electroiyte battery, comprising:
a negative electrode comprising a negative electrode active material,
a positive electrode comprising the positive electrode active material of claim 6; and
a nonaqueous electrolyte.

8. A nonaqueous electrolyte battery, comprising:
a negative electrode comprising a negative electrode active material,
a positive electrode comprising the positive electrode active material of claim 1; and
a nonaqueous electrolyte.

9. The nonaqueous electrolyte battery of claim 8, wherein the negative electrode active material comprises a lithium titanium oxide having a spinel structure.

10. A battery pack, comprising the nonaqueous electrolyte battery of claim 8.

11. The battery pack according to claim 10, further comprising:
an energizing external terminal; and
a protective circuit.

12. A vehicle comprising the battery pack according to claim 10.

13. A battery pack comprising plural nonaqueous electrolyte batteries, each of the nonaqueous electrolyte batteries being the nonaqueous electrolyte battery according to claim 8, and the nonaqueous electrolyte batteries being electrically connected in series, in parallel or with a combination of series connection and parallel connection.

14. The positive electrode active material of claim 1, wherein the positive electrode active material is $LiMn_{1-a-b}Fe_aMg_bPO_4$ ($0 < a \leq 0.35$ and $0 < b \leq 0.15$).

* * * * *

UNITED STATES PATENT AND TRADEMARK OFFICE
CERTIFICATE OF CORRECTION

PATENT NO. : 9,923,203 B2  
APPLICATION NO. : 14/505983  
DATED : March 20, 2018  
INVENTOR(S) : Keigo Hoshina et al.

Page 1 of 1

It is certified that error appears in the above-identified patent and that said Letters Patent is hereby corrected as shown below:

Claim 6, Column 22, Line 50, change "material of cl aim 1," to --material of claim 1,--.

Signed and Sealed this  
Fifteenth Day of May, 2018

Andrei Iancu  
*Director of the United States Patent and Trademark Office*